Figure 1:
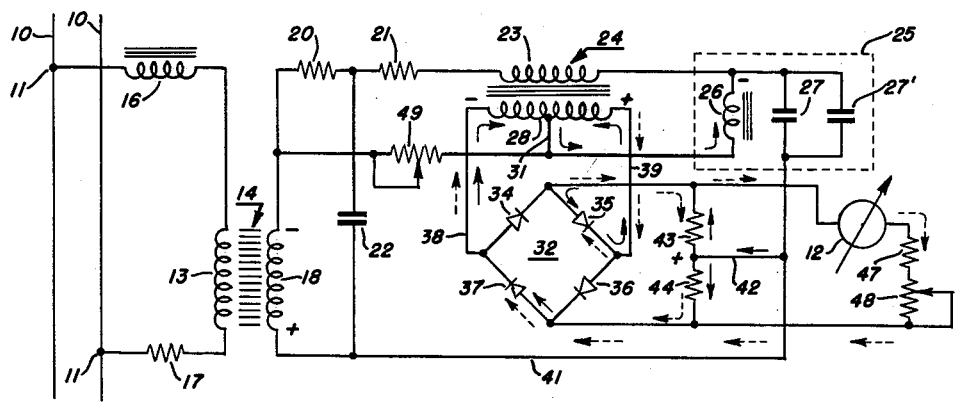

May 8, 1962 R. F. ESTOPPEY 3,034,052
FREQUENCY METER
Filed April 1, 1959

ROYDEN F. ESTOPPEY
INVENTOR.

BY
Rudolph J. Lurick
ATTORNEY

United States Patent Office 3,034,052
Patented May 8, 1962

3,034,052
FREQUENCY METER
Royden F. Estoppey, Berkeley Heights, N.J., assignor to Daystrom, Incorporated, Murray Hill, N.J., a corporation of New Jersey
Filed Apr. 1, 1959, Ser. No. 803,521
8 Claims. (Cl. 324—82)

This invention relates to a frequency meter and more particularly to a frequency sensitive bridge network employing a ring modulator and an associated circuit in which the self-inductance of an inductor is resonated with the capacitance of a high quality capacitor.

The circuit herein disclosed includes a ring modulator, or modulation bridge, in which the signal current is coupled into the bridge by means of a current transformer, while the switching current is derived from a shunt tank circuit, and more particularly from the current through one branch of such shunt tank circuit.

The advantages of my novel circuit over many prior art frequency meters include:

(1) The circuit is compensated for voltage changes;
(2) Error due to the presence of harmonic frequencies is reduced to a minimum;
(3) Since a high inductance, single winding inductor is used in the switching current circuit, the associated shunt capacitor may be of relatively small value whereby a mica capacitor, or the like, may be used as a practical matter. Mica capacitors remain stable under extreme temperature conditions whereby the circuit is of particular use under adverse conditions;
(4) A simple filter circuit corrects for harmonic error.
(5) Scale adjustment can be controlled by adjusting the values of variable resistors without the necessity of varying either inductor or capacitor values.

An object of this invention is the provision of a rugged and efficient frequency meter having high sensitivity and which may be produced at relatively low cost.

An object of this invention is the provision of a frequency meter employing a modulator bridge in which the signal current is coupled to the bridge via a current transformer while the switching current is supplied thereto by means of a shunt tank circuit arrangement.

An object of this invention is the provision of a frequency meter which includes a saturable transformer and filter network in the input circuit thereof for voltage regulation and harmonic filtering, respectively.

An object of this invention is the provision of a frequency meter comprising a D.-C. indicating instrument, a rectifier modulator bridge network and associated circuitry for obtaining readings on the D.-C. instrument which are indicative of the frequency of the potential applied to the meter.

An object of this invention is the provision of a frequency meter for measuring the frequency of an alternating current source and comprising a modulator bridge circuit having rectifier elements sensed in the same direction going around the bridge, a pair of series connected resistors connected across one set of opposed bridge junctions, a current transformer having a center-tapped secondary winding connected across the other set of opposed bridge junctions and having a primary winding, a shunt-connected resonant circuit including an inductor and a capacitor in parallel branches thereof, the said capacitor and inductor being resonant at a frequency displaced from the nominal frequency of the alternating current source, means connecting the said primary winding and resonant circuit in series circuit and to the alternating current source, means connecting the said inductor and capacitor to the bridge through the center tap on the said secondary winding and the junction between the pair of series connected resistors, and an indicating circuit connected across the said one set of opposed bridge junctions.

These and other objects and advantages will become apparent from the following description when taken with the accompanying drawings, which drawings are for purposes of illustration and are not to be construed as defining the scope or limits of the invention, reference being had for the latter purpose to the appended claims.

Figure 2:
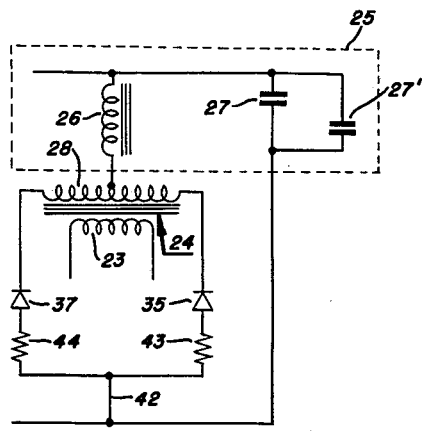
Figure 3:
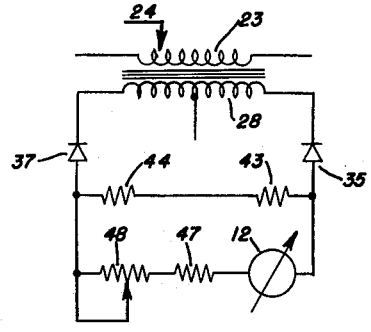

In the drawings wherein like reference characters denote like parts in the several views:

FIGURE 1 is a schematic circuit diagram of my novel frequency meter;
FIGURE 2 is a schematic circuit diagram of elements included in the switching circuit of the bridge at a given instant of the operating cycle; and
FIGURE 3 is a schematic circuit diagram of elements included in the signal circuit of the bridge at the said same instant of the operating cycle of FIGURE 2.

Referring to FIGURE 1 of the drawings, reference numeral 10, 10 designates a line which is supplied by a suitable A.-C. power source, not shown in the drawings, but which may comprise, for example, a 400 cycle, 110 volt source. My novel frequency meter, which is connected across the line 10, 10 as at 11, 11, produces a D.-C. output current which is a function of the line frequency, which output current can be measured on a D.-C. instrument 12. The line voltage is connected to the primary winding 13 of a saturable core transformer 14 through a series connected choke 16 and resistor 17 which serve to limit the current in the transformer primary winding. The saturable transformer provides voltage regulation whereby the D.-C. output through the meter 12 remains substantially constant over a range of 105–130 volts.

The voltage developed at the saturable transformer secondary winding 18 is filtered by series connected resistors 20 and 21 in conjunction with a shunt connected capacitor 22; which filter circuit functions to reduce the harmonic content of the wave from the saturable transformer 14, thereby reducing harmonic error. The filtered current output from the transformer 14 is connected through the primary winding 23 of a current transformer 24 and through a resonant inductor-capacitor network 25 in series with the winding 23, which network 25 comprises an inductor 26, capacitor 27, and trimmer capacitor 27', if desired. The transformer 24 is provided with a center-tapped secondary winding 28; the center tap 31 thereof being connected to the other end of the inductor 26.

The frequency meter includes a rectifier modulator bridge 32 comprising four rectifier elements 34, 35, 36 and 37 sensed in the same direction going around the bridge. For ruggedness and reliability, the rectifier elements are preferably of the semi-conductor type, such as germanium rectifiers, although they may be of the vacuum tube type. The modulator bridge functions as a polarized rectifier in my novel frequency meter circuit.

A signal voltage is supplied to the modulator bridge through the current transformer 24; the voltage of the transformer primary winding 23 being coupled by transformer action to the transformer secondary winding 28, the ends of which winding are connected across one conjugate diagonal arm of the modulator bridge through the leads 38 and 39.

A polarizing, or switching, current is supplied to the modulator bridge 32 by the circulating, or oscillatory, current in the L-C network 25. As mentioned above, one end of the inductor 26 is connected to the center tap 31 on the transformer secondary winding 28, which winding is connected across the one conjugate diagonal arm of the bridge. The shunt connected capacitors 27 and 27' are connected through a lead wire 41 to the lower end of the saturable core transformer secondary winding 18, and also through a lead wire 42 to the junction between a pair of series connected resistors 43 and 44 connected across the other conjugate diagonal arm of the modulator bridge. Thus, it will be seen, that the polarizing, or switching current is supplied to the conjugate diagonal arms of the modulator bridge through the center-tapped current transformer secondary winding 28 and the series connected resistors 43 and 44; the switching current comprising that portion of the oscillatory current within the L-C network 25 in the inductive branch thereof. It will be further noted that the filtered current output from the saturable core transformer 14 energizes both the current transformer 24 and the L-C network 25, which transformer 24 and network 25 are connected in a series circuit arrangement, with the transformer 24 supplying the signal current to the modulator bridge and the oscillatory current of the network 25 supplying the switching current thereto.

The other conjugate diagonal arm of the modulator bridge is connected also to the series connected D.-C. instrument 12, resistor 47 and potentiometer 48. The meter 12, as mentioned above, provides a visual indication of the frequency of the energy on the line 10, 10. Since the rectifier modulator bridge circuit is not a ratio-system and, consequently, is voltage-dependent directly as the instrument deflection varies from the balance frequency position, the frequency meter is accurate when the voltage input to the bridge is relatively constant. In practice, the frequency range of the meter may be from 380 to 420 cycles per second, for example, and by proper adjustment and/or selection of the circuit components a frequency range of from 395 to 405 cycles per second may be obtained, if desired, for use wherein the line frequency is maintained within that range, or where the measurement of frequencies outside that range is unnecessary. Adjustment of the potentiometer 48 in series with the instrument 12 controls the end scale deflection of the said instrument. The frequency at which zero current output is obtained from the modulator bridge is determined, primarily, by the resonant frequency of the L-C network 25. A potentiometer 49 is connected between the transformer secondary winding 18 and the center tap 31 on the transformer secondary winding 28, through which potentiometer an adjustable amount of switching current (in addition to the switching current through the inductor 26) is fed to the modulator bridge, the purpose of which is described in detail below in the description of the circuit operation.

The operation of my above described frequency meter will now be described. The mathematical analysis of the bridge network and associated circuitry is quite complex and is not presented here as the general operation of the apparatus can be explained from the known characteristics of the said modulator bridge and associated circuitry. In FIGURE 1 of the drawings, the current flow for one-half cycle of operation is shown; and in the following description the values of the resistors 43 and 44 are identical. The "+" and "—" signs adjacent the secondary winding 28 of the transformer 24, and at the upper end of the inductor 26 and the lead wire 42, indicate the polarity established at a given instant. The solid lines and arrows indicate the path and direction of the current from the lead wire 42 through the inductor 26 and will be hereinafter referred to as the "switching current." The broken lines and arrows indicate the path and direction of the current flow from the transformer winding 28 of the transformer 24 and will hereinafter be referred to as the "signal current." The switching current switches alternate pairs of rectifier elements in diagonally opposite arms of the modulator bridge from conducting to non-conducting. In the drawing, the two rectifier elements 35 and 37 are conducting at the indicated polarity of the reference current while the rectifier elements 34 and 36 are non-conducting. It is seen that with a center-tapped winding 28 and with the lead wire 42 connected to the junction between equal valued resistors 43 and 44, that there will be no swtiching current flowing in the meter 12 and, hence, no indication on the meter due to the action of the switching current. It is further seen that the switching current comprises the oscillatory, or circulation, current of the L-C network 25. Reference is made to FIGURE 2 wherein the circuit elements which are included in the path of the switching current under the polarity conditions of FIGURE 1 are shown. It will be seen that a shunt circuit (comprising the resistor 44, rectifier element 37 and one-half of the winding 28 as one branch, and the resistor 43, rectifier element 35 and the other half of the winding 28 as the other branch) is in series circuit with the inductor 26, and that the capacitors 27 and 27' are in shunt with the series connected inductor and the said shunt circuit.

Referring again to FIGURE 1, the low resistance path for the flow of signal current from the transformer 24 includes the rectifier elements 35 and 37, and the signal current path may be traced from the positive side of the transformer secondary winding 28 and through the rectifier element 35, from which it may divide into two parallel paths; one path through the series connected resistors 43 and 44, and the other through the series connected indicating instrument 12, resistor 47 and potentiometer 48. The currents recombine and pass through the rectifier element 37 to the negative side of the transformer secondary winding 28. The circuit elements for the above-described signal current path are shown, apart from the remainder of the frequency meter circuit, in FIGURE 3 of the drawings.

The rectifier elements 34 and 36 are conductive one-half cycle later when the polarity of the switching current is reversed. It is apparent that the signal current and switching current are of the same frequency as they are obtained from the same A.-C. lines 10, 10, therefore, the signal voltage reverses polarity simultaneously with the reference voltage. Again, none of the switching current through the inductor 26 flows in the indicating instrument 12 and, further, the signal current flow remains in the same direction through the said instrument. Thus, a pulsating D.-C. current flows through the D.-C. instrument 12 so long as the polarity of the signal and switching currents change simultaneously.

The characteristics of the rectifier elements 34—37 should be the same among the rectifier elements. The exact magnitude of the instrument deflection or the relationship between the instrument and the alternating current components is not particularly important as the essential requirement is that the instrument provides a substantial deflection to indicate relatively small changes in the line frequency. The scale of the instrument 12 is calibrated in terms of "frequency," or "per-cent frequency," or other suitable markings.

By assigning a proper value to the inductor 26, the magnitude of the switching current flowing through the modulator bridge is kept larger than the value of the signal current. This switching current reduces the resistance of the rectifier elements to substantially the lowest values. If the polarity of either the signal or switching currents is reversed the direction of current flow through the meter 12 is also reversed. The D.-C. instrument is preferably of the type wherein the zero position is at one end of the scale and, therefore, the signal and switching connections should be such that the meter deflection is in the proper direction.

A property of the modulator bridge which is essential in the function of the bridge for frequency meter purposes is that only the in-phase component (or 180° out-of-phase component) of the signal current, with respect to the switching current, will be indicated on the meter 12, while the quadrature signal current component is not indicated at the D.-C. meter 12. At the resonant frequency of the L-C network 25, the switching current approaches a 90 degree phase relation with the signal current. Due, however, primarily to the resistance in the tank circuit from which the switching current is derived (i.e., the resistance of the rectifier elements and the resistors 43 and 44) the signal current includes a small in-phase (or 180° out-of-phase) component with respect to the switching current which component results in a small deflection of the instrument 12 at the said resonant frequency. As mentioned above, the D.-C. instrument 12 is preferably of the type wherein the normal zero position is at one end of the scale. To shift the scale, and to thereby obtain zero meter deflection at the resonant frequency, a second switching current of constant phase and amplitude with respect to the signal current, is introduced into the modulator bridge, which current includes a small in-phase (or 180° out-of-phase) component with respect to the signal current. The meter deflection resulting from such second switching is opposite the deflection resulting from the switching current derived from the resonant tank circuit. By proper adjustment of the potentiometer 49, the meter deflection can be made zero at the desired frequency. If the resonant frequency of the tank circuit is precisely the desired zero deflection frequency of the instrument 12, the potentiometer 49 is adjusted to produce zero meter deflection at the resonant frequency. If, for practical reasons, the resonant frequency of the tank circuit is not precisely the desired zero deflection frequency of the instrument 12, by adjustment of potentiometer 49, the meter deflection can be made zero at the desired frequency. If the resonant frequency of the tank circuit is precisely the desired zero deflection frequency of the instrument 12, the potentiometer 49 is adjusted to produce zero meter deflection at the resonant frequency. If, for practical reasons, the resonant frequency of the tank circuit is not quite the desired zero deflection frequency of the instrument, the potentiometer 49 is adjusted to produce zero meter deflection at such desired frequency. It will be understood, then, that for minor frequency compensation, adjustment of the potentiometer is made rather than adding trimmer capacitors to the network 25 or changing the number of turns on the inductor 26 therein. After the zero meter deflection setting is made by adjustment of the potentiometer 49, the meter full scale reading may be adjusted to the desired frequency by adjustment of the potentiometer 48 in series with the meter.

Many important practical advantages over prior art frequency meter circuits result from the use of my novel circuit arrangement. In the first place, the circuit is simply compensated for voltage changes by the inclusion of the saturable core transformer 14 and the choke and resistor 16 and 17, respectively, in the primary winding thereof. Further, a simple filter circuit, comprising the resistors 20 and 21 and the capacitor 22, corrects for harmonic error. Unlike many prior art arrangements, the filter capacittor 22 does not have to be matched to the inductance of any circuit inductors. Of prime importance in producing a rugged and stable device at a low cost is the fact that with my arrangement it is possible to use a mica (or synthetic mica) capacitor, or capacitors 27, 27', in the network 25 since the inductor 26 is a single winding and can be wound with many turns of wire for a large inductance. A toroidal core, non-adjustable inductor is preferred, which may, if desired, include a plurality of fixed taps on the single winding. The use of a mica capacitor, or capacitors, provides a stable output in the face of exposure thereto to a wide range of temperatures. Other capacitors required to give higher capacitance, are not as stable as mica, or synthetic mica, capacitors.

If a frequency meter having a range of from 380 to 420 cycles per second is desired, by way of example, wherein the normal line frequency is 400 cycles per second, the inductor 26 and capacitor 27 (or capacitors 27 and 27') are selected to provide a switching circuit resonant frequency of as near to 380 cycles per second as is practical, and zero meter deflection at 380 cycles per second is set by adjustment of the potentiometer 49. Ordinarily, the use of the trimmer capacitor 27' is unnecessary since the potentiometer 49 is used to compensate for deviation of the resonant frequency of the shunt switching circuit from the desired frequency of 380 cycles per second, in the above example. The meter full scale reading is adjusted by the potentiometer 48 to the desired 420 cycle per second frequency, and the normal line frequency of 400 cycles per second is indicated at about mid-scale deflection intermediate the respective 380 and 420 cycles per second zero and full scale deflections.

It will here be understood that in practice, in place of the potentiometers 48 and 49, resistors of the proper value are preferably selected for use in place thereof; the potentiometers having been shown, primarily, for purposes of illustration and simplicity of explanation.

Having now described my invention in detail in accordance with the patent statutes, various other changes and modifications will suggest themselves to those skilled in this art, and it is intended that such changes and modifications shall fall within the spirit and scope of the invention as recited in the following claims.

I claim:

1. A frequency meter for measuring the frequency of an alternating current source and comprising a modulator bridge circuit having rectifier elements sensed in the same direction going around the bridge, a pair of series connected resistors connected across one set of opposed bridge junctions, a current transformer having a center-tapped secondary winding connected across the other set of opposed bridge junctions and having a primary winding, a shut-connected resonant circuit including an inductor and a capacitor in parallel branches thereof, the said capacitor and inductor being resonant at a frequency displaced from the nominal frequency of the alternating current source, means connecting the said primary winding and resonant circuit in series circuit and to the alternating current source, means connecting the said inductor and capacitor to the bridge through the center tap on the said secondary winding and the junction between the pair of series connected resistors, respectively, and an indicating circuit connected across the said one set of opposed bridge junctions.

2. The invention as recited in claim 1 including a third resistor, and means connecting the said alternating current source to the center tap on the transformer through the said third resistor and to the junction between the said pair of series connected resistors, a constant phase and amplitude switching current being connected to the modulator bridge through the said third resistor.

3. The invention as recited in claim 1 wherein the said inductor includes a multiple turn single winding and the said capacitor comprises a mica capacitor.

4. The invention as recited in claim 1 wherein the said indicating circuit includes a D.-C. indicating instrument.

5. A frequency meter for measuring the frequency of an alternating current source having a predetermined nominal frequency, the said frequency meter comprising a modulator bridge having rectifier elements sensed in the same direction going around the bridge, a pair of series connected resistors connected across one set of opposed bridge junctions, a current transformer having a primary winding and having also a secondary winding connected across the other set of opposed bridge junctions, a capacitor, a single winding inductor, the said capacitor and inductor being resonant at a frequency below the nominal alternating current source frequency, means connecting one end of the capacitor and inductor together and to one end of the current transformer primary winding, means connecting the other end of the current transformer primary winding to one side of the said alternating current source, means connecting the other end of the said capacitor to the other side of the said alternating current source and to the junction between the said pair of series connected resistors, and an indicating circuit including a D.-C. indicating instrument connected across the said one set of opposed bridge junctions.

6. The invention as recited in claim 5 including a third resistor, and means connecting the said third resistor between the center tap on the transformer secondary winding and the said other end of the current transformer primary winding.

7. The invention as recited in claim 5 wherein the said inductor comprises a multiple turn single winding, and the said capacitor is of the mica type.

8. The invention as recited in claim 5 wherein the normal zero position of the said indicating instrument is at one end of the scale thereof, the instrument being unenergized at the resonant frequency of the said inductor and capacitor.

References Cited in the file of this patent

UNITED STATES PATENTS

| | | |
|---|---|---|
| 2,290,327 | Hansell | July 21, 1942 |
| 2,682,633 | Woerdemann | June 29, 1954 |
| 2,829,343 | Miller | Apr. 1, 1958 |
| 2,905,896 | Kamp | Sept. 22, 1959 |

FOREIGN PATENTS

| | | |
|---|---|---|
| 371,014 | Great Britain | Apr. 8, 1932 |
| 871,031 | Germany | Mar. 19, 1953 |
| 690,158 | Great Britain | Apr. 15, 1953 |
| 727,434 | Great Britain | Mar. 30, 1955 |

OTHER REFERENCES

"Frequency Monitor," article, publication title unknown, June 18, 1948.